(12) United States Patent
Echeverria

(10) Patent No.: US 9,231,895 B2
(45) Date of Patent: Jan. 5, 2016

(54) TAG MANAGEMENT OF INFORMATION TECHNOLOGY SERVICES IMPROVEMENT

(71) Applicant: International Business Machines Corporation, Armonk, NY (US)

(72) Inventor: Pedro Ivo Martins Echeverria, Hortolandia Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 479 days.

(21) Appl. No.: 13/658,329

(22) Filed: Oct. 23, 2012

(65) Prior Publication Data

US 2014/0115071 A1     Apr. 24, 2014

(51) Int. Cl.
G06F 15/16 (2006.01)
H04L 12/58 (2006.01)
H04L 12/18 (2006.01)
G06Q 10/10 (2012.01)

(52) U.S. Cl.
CPC ............ H04L 51/046 (2013.01); G06Q 10/107 (2013.01); H04L 12/1895 (2013.01)

(58) Field of Classification Search
USPC .......................................................... 709/206
See application file for complete search history.

(56) References Cited

U.S. PATENT DOCUMENTS

| | | | |
|---|---|---|---|
| 6,122,657 A | 9/2000 | Hoffman, Jr. et al. | |
| 6,553,416 B1 | 4/2003 | Chari et al. | |
| 7,624,171 B1 * | 11/2009 | Rodkey et al. | 709/223 |
| 7,743,137 B2 * | 6/2010 | Sarwono | H04L 12/1895 709/206 |
| 7,822,868 B2 | 10/2010 | Gassewitz et al. | |

(Continued)

FOREIGN PATENT DOCUMENTS

| | | |
|---|---|---|
| JP | 9050459 A | 2/1997 |
| JP | 11203327 A | 7/1999 |

(Continued)

OTHER PUBLICATIONS

Ting Chen et al, Content Recommendation System Based on Private Dynamic User Profile, Proceedings of the Sixth International Conference on Machine Learning and Cybernetics, Hong Kong, IEEE, Aug. 2007, pp. 2112-2118.

(Continued)

*Primary Examiner* — Kevin Bates
*Assistant Examiner* — Mark A Scott
(74) *Attorney, Agent, or Firm* — Patrick J. Daugherty; Driggs, Hogg, Daugherty & Del Zoppo Co., LPA

(57) ABSTRACT

Alert messages are generated containing a text description of an interruption of service of a component in a networked computer system infrastructure; a service provider identity tag that identifies a type of service provider personnel required to engage the computer system infrastructure and abate or diagnose the service interruption; and one or more component tags that identify a component associated with the service interruption. A message board system posts the generated alert message on a support message board that is accessible by support team service provider professionals, each identified by the service provider identity tag and the component tags. Support team members post different reply messages that each comprise different service provider identity tags, and the message board system broadcasts different simple syndication outputs to different recipients based on their associations with the different respective service provider identity tags.

17 Claims, 2 Drawing Sheets

(56) References Cited

U.S. PATENT DOCUMENTS

| | | | |
|---|---|---|---|
| 7,912,933 | B2 | 3/2011 | Wright et al. |
| 7,945,470 | B1* | 5/2011 | Cohen ............... G06Q 10/06311 455/433 |
| 7,966,369 | B1* | 6/2011 | Briere .................... G06Q 10/10 707/616 |
| 8,443,072 | B1* | 5/2013 | Orbach ......................... 709/224 |
| 8,776,149 | B1* | 7/2014 | Koch ................. H04N 21/4334 725/37 |
| 2003/0095032 | A1 | 5/2003 | Hoshino et al. |
| 2004/0215765 | A1* | 10/2004 | Asher ................. H04L 41/0273 709/224 |
| 2006/0259741 | A1 | 11/2006 | Hastie |
| 2007/0067725 | A1* | 3/2007 | Cahill ................... G05B 23/027 715/733 |
| 2007/0174768 | A1* | 7/2007 | Sen ..................... G06F 11/0709 715/700 |
| 2008/0126403 | A1* | 5/2008 | Moon ............... G06F 17/30607 |
| 2008/0209431 | A1* | 8/2008 | La Vecchia .... G06Q 10/063112 718/104 |
| 2008/0215675 | A1 | 9/2008 | Kaminitz et al. |
| 2009/0006285 | A1* | 1/2009 | Meek .................... G06Q 10/10 706/12 |
| 2009/0125592 | A1* | 5/2009 | Hartwich et al. ............. 709/206 |
| 2009/0150400 | A1* | 6/2009 | Abu-Hakima et al. ......... 707/10 |
| 2009/0276771 | A1* | 11/2009 | Nickolov et al. ............. 717/177 |
| 2009/0292773 | A1* | 11/2009 | Leedberg ............ G06F 17/3089 709/205 |
| 2010/0161631 | A1 | 6/2010 | Yu et al. |
| 2010/0205169 | A1 | 8/2010 | Narayan et al. |
| 2010/0217837 | A1* | 8/2010 | Ansari et al. .................. 709/218 |
| 2010/0269052 | A1* | 10/2010 | Uhlig ................... G06Q 10/06 715/752 |
| 2010/0321175 | A1* | 12/2010 | Gilbert ................ B60R 16/0234 340/438 |
| 2011/0022433 | A1* | 1/2011 | Nielsen .................. G06Q 10/06 705/7.27 |
| 2011/0107199 | A1 | 5/2011 | Bellessort et al. |
| 2012/0077527 | A1* | 3/2012 | Santiago et al. ............... 455/466 |
| 2012/0102072 | A1* | 4/2012 | Jia ...................... G06F 17/30197 707/803 |
| 2012/0215911 | A1* | 8/2012 | Raleigh et al. ................. 709/224 |
| 2012/0303768 | A1* | 11/2012 | Fiennes ............... H04N 21/4126 709/220 |
| 2013/0124643 | A1* | 5/2013 | DeLuca et al. ................. 709/206 |
| 2013/0198296 | A1* | 8/2013 | Roy ..................... G06Q 10/107 709/206 |
| 2013/0346582 | A1* | 12/2013 | Pastor ................... H04L 12/281 709/223 |
| 2014/0046997 | A1* | 2/2014 | Dain ................... H04L 67/2861 709/201 |
| 2014/0269417 | A1* | 9/2014 | Yu ....................... H04L 41/0803 370/254 |

FOREIGN PATENT DOCUMENTS

| | | |
|---|---|---|
| JP | 11213007 A | 8/1999 |
| JP | 2001142929 A | 5/2001 |
| JP | 2002073708 A | 3/2002 |
| JP | 2003281197 A | 10/2003 |
| JP | 2003281199 A | 10/2003 |
| JP | 2003281203 A | 10/2003 |
| JP | 3470248 B2 | 11/2003 |
| JP | 4027904 B2 | 12/2007 |
| JP | 2009265706 A | 11/2009 |

OTHER PUBLICATIONS

Milenko Petrovic et al, CMS-ToPSS: Efficient Dissemination of RSS Documents, Proceedings of the 31st VLDB Conference, Trondheim, Norway, 2005, pp. 1279-1282.

TinyURL, LLC, TinyURL.com, Making over a billion long URLs usable! Serving billions of redirects per month, http://tinyurl.com/, Jul. 3, 2012, pp. 1-4.

IBM, Design Method for Parallel BOM Explosion, IPCOM000179035D, ip.com Prior Art Database Technical Disclosure, Feb. 5, 2009, pp. 1-8.

\* cited by examiner

TAG MANAGEMENT OF INFORMATION TECHNOLOGY SERVICES IMPROVEMENT

FIELD OF THE INVENTION

Embodiments of the present invention relate to the management of communication flow with regard to Information Technology (IT) infrastructure services.

BACKGROUND

When an application outage or other issue happens in an IT environment, a support team is typically engaged and a communication process is started. Information about the issue must generally be communicated to multiple stakeholder groups, often in real time, and information content about the issue varies according to each stakeholder type or identity. For example, an end user needs to know when the application will be back online, while an application executive needs to know the business impact, an application owner needs incremental updates on the issue status, and the support team needs to discuss technical details of the issue. The information flow during a long communication process in some cases is inefficient because some stakeholders end up receiving more or less information than what they need.

BRIEF SUMMARY

In one embodiment of the present invention, a method for differentiated communications in an application support domain includes a message board system automatically generating an alert message containing a text description of an interruption of service of a component in a networked computer system infrastructure; a service provider identity tag that identifies a type of service provider personnel required to engage the computer system infrastructure and abate or diagnose the service interruption; and one or more component tags that identify a component associated with the service interruption. The message board system posts the generated alert message on a support message board that is accessible by a support team of service provider professionals, each identified by the service provider identity tag and the component tags. In response to one of the support team members posting a first text message reply to the alert message on the support message board that comprises the service provider identity tag and the component tags, the message board system broadcasts a first really simple syndication output to each of the support team members. Further, in response to one of the support team members posting a second reply text message on the message board associated with the alert message that comprises the service provider tag, the component tags and another identity tag that is different from the service provider identity tag, the message board system broadcasts a second really simple syndication output to recipients that are each associated with the service provider identity tag, the other different identity tag, and the component tags, without broadcasting the first really simple syndication output to the recipients of the second really simple syndication output.

In another embodiment, a system has a processing unit, computer readable memory and a tangible computer-readable storage medium with program instructions, wherein the processing unit, when executing the stored program instructions, automatically generates an alert message containing a text description of an interruption of service of a component in a networked computer system infrastructure; a service provider identity tag that identifies a type of service provider personnel required to engage the computer system infrastructure and abate or diagnose the service interruption; and one or more component tags that identify a component associated with the service interruption. The processing unit further posts the generated alert message on a support message board that is accessible by a support team of service provider professionals, each identified by the service provider identity tag and the component tags. In response to one of the support team members posting a first text message reply to the alert message on the support message board that comprises the service provider identity tag and the component tags, the message board system broadcasts a first really simple syndication output to each of the support team members. Further, in response to one of the support team members posting a second reply text message on the message board associated with the alert message that comprises the service provider tag, the component tags and another identity tag that is different from the service provider identity tag, the processing unit broadcasts a second really simple syndication output to recipients that are each associated with the service provider identity tag, the other different identity tag, and the component tags, without broadcasting the first really simple syndication output to the recipients of the second really simple syndication output.

In another embodiment, a computer program product has a tangible computer-readable storage medium with computer readable program code embodied therewith, the computer readable program code comprising instructions that, when executed by a computer processing unit, cause the computer processing unit to automatically generate an alert message containing a text description of an interruption of service of a component in a networked computer system infrastructure; a service provider identity tag that identifies a type of service provider personnel required to engage the computer system infrastructure and abate or diagnose the service interruption; and one or more component tags that identify a component associated with the service interruption. The computer processing unit further posts the generated alert message on a support message board that is accessible by a support team of service provider professionals, each identified by the service provider identity tag and the component tags. In response to one of the support team members posting a first text message reply to the alert message on the support message board that comprises the service provider identity tag and the component tags, the message board system broadcasts a first really simple syndication output to each of the support team members. Further, in response to one of the support team members posting a second reply text message on the message board associated with the alert message that comprises the service provider tag, the component tags and another identity tag that is different from the service provider identity tag, the computer processing unit broadcasts a second really simple syndication output to recipients that are each associated with the service provider identity tag, the other different identity tag, and the component tags, without broadcasting the first really simple syndication output to the recipients of the second really simple syndication output.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
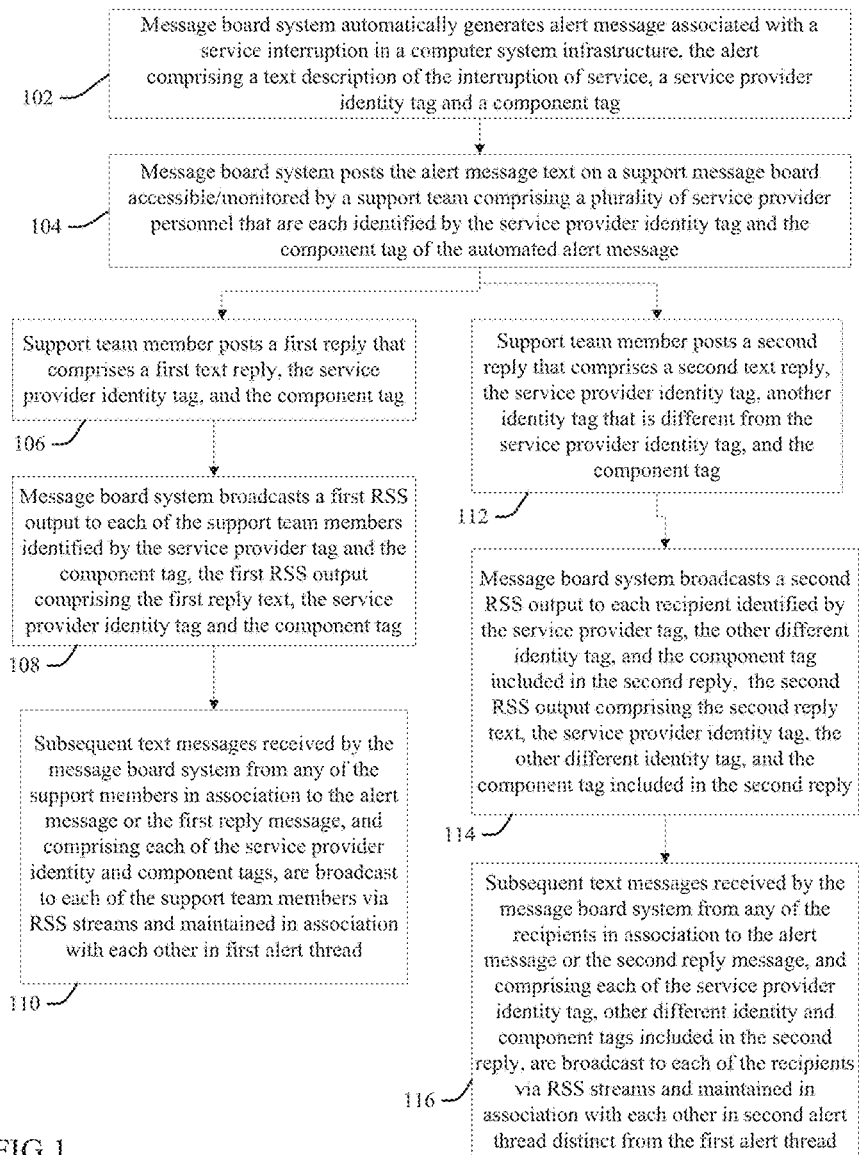
FIG. 1 is a block diagram illustration of a method or process for differentiated communications in an application support domain according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

When an application outage and other IT infrastructure problem or issue occurs, prior art systems send automated text communication alerts and notices to one or more technicians, managers, customers, clients, etc. A support technician may then start a discussion forum and forward notes to engage other stakeholders, wherein subsequent responses are promulgated and distributed to each stakeholder as they become aware of or involved in the incident. However, such an approach is inefficient in getting only desired or necessary information to each individual stakeholder. By blindly copying all, some receive much more information than they need or desire, creating an overflow of data communication and information with respect to these stakeholders. Others may need or desire more detail or additional data and details, and be left without some necessary or desired information that is not suitable for the generic messaging being exchanged amongst all parties. Such approaches also require frequent manual updates of distribution lists, and also require recurrent management decisions and discussions with respect to the identity of stakeholders that should receive certain information on a continuing basis, and also whether they may be receiving information on a timely basis for their particular needs.

FIG. 1 illustrates a method or process for differentiated communications in an application support domain. In response to an outage or other interruption of service of a component in a networked computer system infrastructure, at 102 a message board system automatically generates an alert message comprising a text description of the interruption of service, an application tag that identifies a software component associated with the service interruption (for example, an executing application, a virtual machine interface, etc.), a hardware tag that identifies a hardware component associated with the service interruption (for example, a server, client, network switch, etc.), and a service provider identity tag that identifies a type of service provider personnel required to engage the computer system infrastructure and abate or diagnose the service interruption (for example, developer, manager, software engineer, server technician, etc.). The service interruption may be caused by the identified software or hardware components, or merely impact either or both of said components.

At 104 the message board system posts the automatically generated alert message on a support message board that is accessible by or monitored by a support team comprising a plurality of service provider professionals that are each identified by the service provider identity tag, the application tag and the hardware tag in the automated alert message. In some embodiments, posting at 104 further comprises sending the text description of the interruption of service in the alert message to one or more of the identified support team service provider professionals via a Really Simple Syndication (RSS) output, instant message, cellular text message, chat, email or other electronic text message system.

At 106 one of the support team members posts a first reply text message on the message board in response to the alert message, the first reply text message also comprising the service provider identity tag, the application tag and the hardware tag. In response to the first reply posted at 106, at 108 the message board system generates and broadcasts a first RSS output to each of the support team members identified by the service provider identity tag, the application tag and the hardware tag, wherein the first RSS output comprises the text message of the first reply in association with the text description of the interruption of service from the alert message, and also comprises the service provider identity tag, the application tag and the hardware tag.

At 110 subsequent text messages received by the message board system from any of the support members in reply or other association to either the alert message or the first reply message, and comprising each of the service provider identity, application tag and hardware tags, are streamed or broadcast to each of the support team members via RSS streams and maintained in association with each other in first alert thread by the message board system.

At 112 one of the support team members posts a second reply text message on the message board in response to or otherwise associated with the alert message, the second reply comprising another identity tag that is different from the service provider identity tag, as well as the service provider tag and at least one of the application tag and the hardware tag. In response to the second reply posted at 112, at 114 the message board system generates and broadcasts a second RSS output to each of a plurality of recipients that are each associated with the service provider identity tag, the other different identity tag, and the at least one of the application tag and the hardware tag included in the second reply, wherein the second RSS output comprises the text message of the second reply in association with the text description of the interruption of service from the alert message, and also comprises the service provider identity tag, other different identity tag, and the at least one of the application tag and the hardware tag included in the second reply.

At 116 subsequent text messages received by the message board system from any of the recipients in reply or other association to either the alert message or the second reply message, and comprising each of the service provider identity, other different identity tag, and the application tag and/or hardware tag included in the second reply, are broadcast or streamed to each of the recipients via RSS streams and maintained in association with each other in a second alert thread that is separate and distinct from the first alert thread by the message board system.

Figure 2:
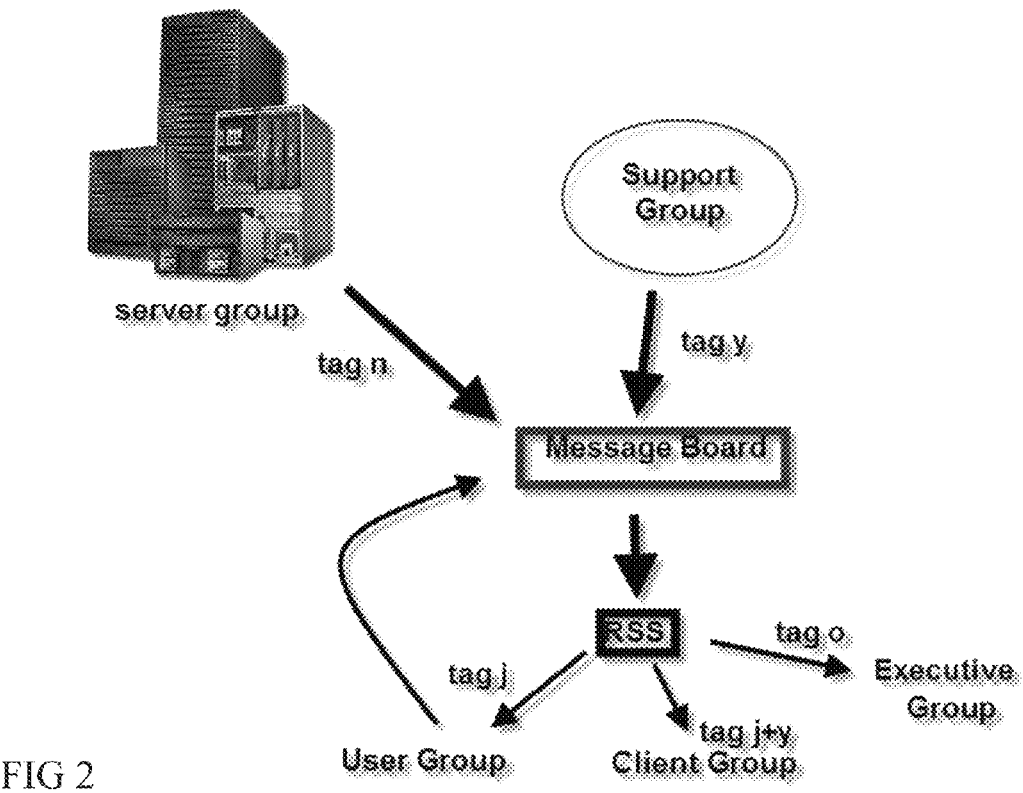
FIG. 2 is a graphic illustration of an RSS communication flow associated with a service interruption according to the embodiment of FIG. 1.

Embodiments of the present invention automate communication flow of an IT issue using tags in order to assure that the right stakeholder gets informed with the right amount and data of information that he needs or desires. FIG. 2 is a graphic illustration of an exemplary automated RSS communication flow associated with a service interruption and generated by the process or system of FIG. 1. The support group members receiving an initial outage alert (at 104, FIG. 1) are each commonly tagged with "tag y," which may function as the service provider identity tag (at 102 and elsewhere within FIG. 1). Service personnel in this example are tagged with "tag n", user groups of the infrastructure are tagged with "tag j", client groups with both "tag j" and "tag y," and executive or management group members are each tagged with "tag o".

A variety of message groupings and unique threads may be managed by the process of FIG. 1. In this example, messages to and among the client group will always be shared in a common thread/RSS feed with the support group members by virtue of sharing the common "tag y". However, the support group members may easily choose to omit the client group members from some of their messages and threads by dropping the "tag j" from such messages, avoiding unnecessary or unwanted communications to the client group. Other group cohorts may easily be included in an existing or new thread by adding their tags, for example adding and updating executive group members within a message thread message reply by adding the "tag o" to a reply and in subsequent communications within an existing thread. The collection of tags of certain groups provides the necessary authority for omitting or adding specific tags to messages posted in the thread. In one example, an executive group member would have the authority necessary to add the tag "o" but would not be allowed to drop tag "j". The definition rules for group tag combinations and their given message tag editing authority can be custom set for each supported environment, for example in accordance with company confidentiality, communication strategy and separation of activities duties and policies pursuant to contract or other agreement terms, and still other parameters and constraints will be apparent to one skilled in the art.

Each communication in the different support team member and second reply recipient groups described in FIG. 1 is accomplished via the same message board mechanism, but wherein posts within the different threads have different specific tag combinations in accordance with the differentiated stakeholders of the groups for which a particular message is of interest. Each stakeholder group may have a unique set of identification tags, wherein every stakeholder group subscribed to the message board for RSS feeds will receive in real time messages filtered according to their unique, respective tags. These groups are also able to utilize the message board with access to their tag level of content.

Embodiments of the present invention optimize communication flow by enabling users to eliminate and filter unnecessary information delivery and manually sort messages by tag. The amount of information managed by a single member or resource group can also be increased, in one aspect in that a single user is enabled to efficiently prioritize and monitor multiple IT environments as a function of interest, device, software application, executive group or client group involvement, for example, keeping threads including executive and client group members sorted to the top of a priority task ranking.

The recipient of the first alert message may be a manager or other person ultimately responsible for handling the issue. The manager may then differentiate information provided about the event to different stakeholders, for example deciding on a business level who else, or who should not be included in subsequent messages, and accordingly generating a plurality of differentiated message threads to different stakeholders; a first message sent to customers, another message to different software and hardware support group based on issue requirements, another message to upper or management advising of status, et cetera. Such decisions may also be made by subsequent message recipients at any point in the process.

Members of any given group created by common tag assignments may be involved in other, different groups, by virtue of having some but not all tags in common. Further independent discussion threads may split off from any group thread by tweaking the tags in any given response. For example, adding another tag will further limit the distribution to only those stakeholders who also have the additional tag. Therefore, not all responses need come back to every member of any given group.

The sizes of the different groups that might receive any given communication may be very different, while replies within each group stay within their respective groups and the other parties do not see their replies. This improves communication efficiencies in that different stakeholders need to receive different levels of communication at different times. An engineer may only need communications with respect to what has happened, what must be done and is being done to fix it, while the business manager may only require information on impact to a customer and its duration. Stakeholders differentiated by group may also reach out and interact with others by creating new tag groups in subsequent message board postings.

Adding a new user to any group may be easily accomplished by adding tags of the group to the user, or by adding the user's tags to new responses in a given thread, which will accomplish automatically subscribing the new user to the feed messages. This provides for efficiencies in making sure that the proper members of any group receive notices when roles change within an organization. For example, if a specified number of employees are designated to support an application, individual employees may be easily on-boarded and off-boarded by changing their job descriptions and tag assignments, independent of their names or other individual identities within the organization.

When an individual employee is replaced through promotion, lateral movement to another group, etc., the individual may leave the position but some or all of the individual's tags remain intact as assigned to the position itself. An employee subsequently assigned to that position may then inherit (receive a transfer of) the tags assigned to that position while occupied by the previous employee, and thus will be automatically included in any other thread and RSS feeds including the previous employee by tag assignment. Further, there is no need for other correspondents and posters to know the individual identity of the new employee to reach him or her and continue to work on an open issue. This may be particularly useful in short-term substitution scenarios, such as vacation and leave situations, as a fill-in person may temporarily inherit those tags of the replaced person, necessary to continue work on certain tasks while the original person is absent.

Thus, by automating the use of text communications and generating and sending differentiated text communications based on specific organization rolls, embodiments of the present invention enable automatic allocations of the right communications to flow to the right stakeholders. Communications may be filtered for proper stakeholder reception by tag. Response time problems are avoided by enabling fill-in personnel to seamlessly continue the work of the stakeholders temporarily missing due to vacations or other periods of unavailability so that communication flows are not disrupted. There is no need to send communications to specifically identify personnel in embodiments of the present invention, and thereby risk disruption if that identified person is not available. By instead sending communications based on tag, both fill-in and normal people appear to be the same person, and serve the same function in keeping the process moving forward.

Reply and other subsequent messages may be generated by using templates or other predefined structures. This may enable control of recipient groups, for example a reply to a client group posting may be restricted to text information relevant to estimated duration of interruption, unless overridden, or wherein other information as to a technical diagnosis may be manually added by a posted notice that it is generally not provided to the client group, in order to suggest or impose text information efficiencies on message board postings.

Tag selection for a given reply posting may be automatic, or manual wherein each writer of a message will have a certain level of authority, determined by his own set/combination of role tags, which will enable him to choose which tags should control the distribution. In some embodiments, there is a default selection of tags wherein all of the tags in a current message that is being replied to will also be applied to the current reply, unless the writer changes those tags. By providing for different threads of communication, it is also possible for some groups to continue to communicate on an issue associated with an outage event independent of the closure of a work ticket or other service item triggered by the outage.

Though prior art systems may suggest automated text notice and message thread procedures, such as U.S. Pat. No. 7,912,933, such approaches choose recipients based on their specific identity and copy all such identified recipients, with at least one party in common on all communications, who therefore must generally be copied on all future related messages to keep a given thread active. In contrast, embodiments of the present invention differentiate the sending and receiving of messages between multiple different recipients based on multiple different role assignments that are independent of their individual identities, thereby efficiently limiting recipients to any reply or related new message to smaller subsets of interested parties. No one person must receive all replies and related messages, thereby sparing persons from the need to review and process all related messages and providing improved workload efficiencies.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 3:
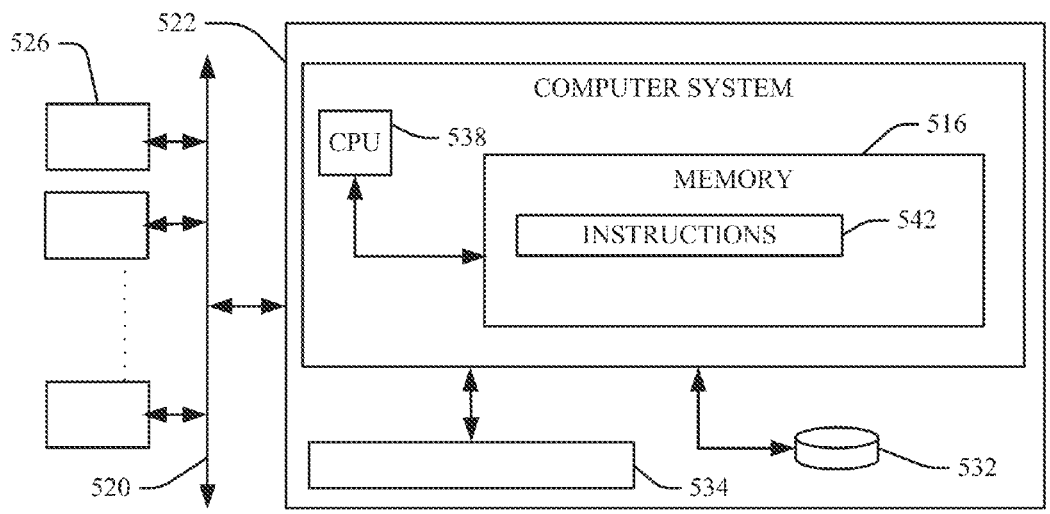
FIG. 3 is a block diagram illustration of a computer system implementation of an embodiment of the present invention.

Referring now to FIG. 3, an exemplary computerized implementation of an embodiment of the present invention includes a computer system infrastructure or other programmable device 522 in communication with a plurality of information technology infrastructure components 526 (servers, clients, programmable devices, applications, etc.). Instructions 542 reside within computer readable code in a computer readable memory 516, or in a computer readable storage system 532, or other tangible computer readable storage medium 534 that is accessed through a computer network infrastructure 520 by a Central Processing Unit (CPU) 538. Thus, the instructions, when implemented by the processing unit 538, cause the processing unit 538 to provide differentiated communications in an application support domain with respect to outages of the infrastructure components 526 as a function of tags as described above with respect to FIGS. 1 and 2.

Embodiments of the present invention may also perform process steps of the invention on a subscription, advertising, and/or fee basis. That is, a service provider could offer to provide differentiated communications in an application support domain with respect to outages of the infrastructure components 526 as a function of tags as described above with respect to FIGS. 1 and 2. The service provider can create, maintain, and support, etc., a computer infrastructure such as the computer system 522, network environment 520, or parts thereof, that perform the process steps of the invention for one or more customers. In return, the service provider can receive payment from the customer(s) under a subscription and/or fee agreement and/or the service provider can receive payment from the sale of advertising content to one or more third parties. Services may comprise one or more of: (1) installing program code on a computing device, such as the computer device 522, from a tangible computer-readable medium device 532 or 534; (2) adding one or more computing devices to a computer infrastructure; and (3) incorporating and/or modifying one or more existing systems of the computer infrastructure to enable the computer infrastructure to perform the process steps of the invention.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the Figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for differentiated communications in an application support domain, the method comprising:

a message board system automatically generating an alert message comprising a text description of an interruption of service of a component in a networked computer system infrastructure, a service provider identity tag that identifies a type of service provider personnel required to engage the computer system infrastructure and abate or diagnose the service interruption, and at least one component tag that identifies a component associated with the service interruption;

the message board system posting the generated alert message on a support message board that is accessible by support team service provider professionals that are each identified by the service provider identity tag and the at least one component tag in the automated alert message;

in response to one of the support team service provider processionals posting a first text message reply to the alert message on the support message board that comprises the service provider identity tag and the at least one component tag, the message board system broadcasting a first really simple syndication message only to each of the support team service provider professionals that are identified by association with the service provider identity tag and the at least one component tag, wherein the first really simple syndication message comprises the text message of the first reply in association with the text description of the interruption of service from the alert message, the service provider identity tag and the at least one component tag; and in response to one of the support team service provider professionals posting a second reply text message on the message board associated with the alert message that comprises the service provider tag, the at least one component tag and another identity tag that is different from the service provider identity tag, the message board system broadcasting a second really simple syndication message only to each of the support team service provider professionals that are identified by association with the service provider identity tag, the other different identity tag, and the at least one component tag, wherein the second really simple syndication message comprises the text message of the second reply in association with the text description of the interruption of service from the alert message, the service provider identity tag, the other different identity tag, and the at least one component tag;

maintaining a plurality of subsequent text messages received from the support team service provider professionals that comprise each of the service provider identity tag and the at least one component tag in association with each other and the alert message or the first reply message in a first alert thread; and maintaining a plurality of subsequent text messages received from the support team service provider professionals that comprise each of the service provider identity tag, the other different identity tag and the at least one component tag in association with each other and the alert message or the second reply message in a second alert thread that is separate and distinct from the first alert thread;

wherein the message board system does not broadcast the first really simple syndication message to the support team service provider professionals recipients of the second really simple syndication message that are identified by association with the service provider identity tag, the other different identity tag, and the at least one component tag; and wherein each of the support team service provider professionals recipients receives in real time really simple syndication messages that are filtered according to associations with respective ones of the service provider identity tag, the other different identity tag, and the at least one component tag.

2. The method of claim 1, wherein the at least one component tag that identifies the infrastructure associated with the service interruption is a plurality of tags that comprises an application tag that identifies a software component associated with the service interruption, and a hardware tag that identifies a hardware component associated with the service interruption.

3. The method of claim 2, further comprising:
sending the text description of the interruption of service in the posted alert message to the support team service provider professionals via an instant message, a cellular text message, a chat text message or an email text message.

4. The method of claim 3, further comprising:
transferring the service provider identity tag, the application tag and the hardware tag from a current support team member of the service provider professionals to a new stakeholder of the support team service provider professionals; and the message board system broadcasting the subsequent text messages received from the support team service provider professionals and maintained in the first alert thread to the new stakeholder but not to the current support team member as a function of the transfer of the service provider identity tag, the application tag and the hardware tag from the current support team member to the new stakeholder.

5. The method of claim 4, further comprising:
transferring the service provider identity tag, the application tag and the hardware tag from the new stakeholder back to the current support team member at the end of a leave period of the current support team member; and the message board system broadcasting the subsequent text messages received from the support members and maintained in the first alert thread to the current support team member but not to the new stakeholder as a function of the transfer of the service provider identity tag, the application tag and the hardware tag back from the new stakeholder to the current support team member.

6. The method of claim 1, further comprising:
integrating computer-readable program code into a computer system comprising a processing unit, a computer readable memory and a computer readable tangible storage medium, wherein the computer readable program code is embodied on the computer readable tangible storage medium and comprises instructions that, when executed by the processing unit via the computer readable memory, cause the processing unit to function as the message board system that automatically generates and posts the alert message on the support message board, and broadcast the first really simple syndication messages to each of the support team members identified by the service provider identity tag and the at least one component tag, and broadcasts the second really simple syndication message to each of the recipients that are each associated with the service provider identity tag, the other different identity tag, and the at least one component tag, without broadcasting the first really simple syndication message to the recipients of the second really simple syndication message.

7. The method of claim 6, wherein the processing unit, when executing the program instructions stored on the tangible computer-readable storage medium via the computer readable memory, further:

maintains the plurality of subsequent text messages received from the support team service provider professionals that comprise each of the service provider identity tag and the at least one component tag in association with each other and the alert message or the first reply message in the first alert thread; and maintains the plurality of subsequent text messages received from the support team service provider professionals that comprise each of the service provider identity tag, the other different identity tag and the at least one component tag in association with each other and the alert message or the second reply message in the second alert thread that is separate and distinct from the first alert thread.

8. A system, comprising:
a processing unit;
a computer readable memory in communication with the processing unit; and
a computer-readable hardware storage device in communication with the processing unit;
wherein the processing unit executes program instructions stored on the computer-readable hardware storage device via the computer readable memory and thereby:

automatically generates an alert message comprising a text description of an interruption of service of a component in a networked computer system infrastructure, a service provider identity tag that identifies a type of service provider personnel required to engage the computer system infrastructure and abate or diagnose the service interruption, and at least one component tag that identifies a component associated with the service interruption;

posts the generated alert message on a support message board that is accessible by support team service provider professionals comprising a plurality of service provider professionals that are each identified by the service provider identity tag and the at least one component tag in the automated alert message;

in response to one of the support team service provider professionals posting a first text message reply to the alert message on the support message board that comprises the service provider identity tag and the at least one component tag, broadcasts a first really simple syndication message only to each of the support team service provider professionals that are identified by association with the service provider identity tag and the at least one component tag, wherein the first really simple syndication message comprises the text message of the first reply in association with the text description of the interruption of service from the alert message, the service provider identity tag and the at least one component tag; and in response to one of the support team service provider professionals posting a second reply text message on the message board associated with the alert message that comprises the service provider tag, the at least one component tag and another identity tag that is different from the service provider identity tag, broadcasts a second really simple syndication message only to each of the support team service provider professionals that are identified by association with the service provider identity tag, the other different identity tag, and the at least one component tag, wherein the second really simple syndication message comprises the text message of the second reply in association with the text description of the interruption of service from the alert message, the service provider identity tag, the other different identity tag, and the at least one component tag, and does not broadcast the first really simple syndication message to the recipients of the second really simple syndication message;

maintains a plurality of subsequent text messages received from the support team service provider professionals that comprise each of the service provider identity tag and the at least one component tag in association with each other and the alert message or the first reply message in a first alert thread; and maintains a plurality of subsequent text messages received from the support team service provider professionals that comprise each of the service provider identity tag, and the other different identity tag and the at least one component tag in association with each other and the alert message or the second reply message in a second alert thread that is separate and distinct from the first alert thread;

wherein the message board system does not broadcast the first really simple syndication message to the support team service provider professionals recipients of the second really simple syndication message that are identified by association with the service provider identity tag, the other different identity tag, and the at least one component tag; and wherein each of the support team service provider professionals recipients receives in real time really simple syndication messages that are filtered according to associations with respective ones of the service provider identity tag, the other different identity tag, and the at least one component tag.

9. The system of claim 8, wherein the at least one component tag that identifies the infrastructure associated with the service interruption is a plurality of tags that comprises an application tag that identifies a software component associated with the service interruption, and a hardware tag that identifies a hardware component associated with the service interruption.

10. The system of claim 9, wherein the processing unit executes the program instructions stored on the computer-readable hardware storage device via the computer readable memory, and thereby further sends the text description of the interruption of service in the posted alert message to the support team service provider professionals via an instant message, a cellular text message, a chat text message or an email text message.

11. The system of claim 10 the processing unit executes the program instructions stored on the computer-readable hardware storage device via the computer readable memory, and thereby further, in response to a transfer of the service provider identity tag, the application tag and the hardware tag from a current support team member of the team service provider professionals to a new stakeholder of the team service provider professionals:

broadcasts the subsequent text messages received from the support team service provider professionals and maintained in the first alert thread to the new stakeholder but not to the current support team member as a function of the transfer of the service provider identity tag, the application tag and the hardware tag from the current support team member to the new stakeholder.

12. The system of claim 11, wherein the processing unit executes the program instructions stored on the computer-readable hardware storage device via the computer readable memory, and thereby further, in response to a transfer of the service provider identity tag, the application tag and the hardware tag from the new stakeholder back to the current support team member at the end of a leave period of the current support team member:

broadcasts the subsequent text messages received from the support members and maintained in the first alert thread to the current support team member but not to the new stakeholder as a function of the transfer of the service provider identity tag, the application tag and the hardware tag back from the new stakeholder to the current support team member.

13. A computer program product for differentiated communications in an application support domain, the computer program product comprising a computer readable hardware storage device having program code embodied therewith, the program code for execution by a computer processing unit to cause the computer processing unit to:

automatically generate an alert message comprising a text description of an interruption of service of a component in a networked computer system infrastructure, a service provider identity tag that identifies a type of service provider personnel required to engage the computer system infrastructure and abate or diagnose the service interruption, and at least one component tag that identifies a component associated with the service interruption;

post the generated alert message on a support message board that is accessible by support team service provider professionals comprising a plurality of service provider professionals that are each identified by the service provider identity tag and the at least one component tag in the automated alert message;

in response to one of the support team service provider professionals service posting a first text message reply to the alert message on the support message board that comprises the service provider identity tag and the at least one component tag, broadcast a first really simple syndication message only to each of the support team service provider professionals that are identified by association with the service provider identity tag and the at least one component tag, wherein the first really simple syndication message comprises the text message of the first reply in association with the text description of the interruption of service from the alert message, the service provider identity tag and the at least one component tag; and in response to one of the support team service provider professionals posting a second reply text message on the message board associated with the alert message that comprises the service provider tag, the at least one component tag and another identity tag that is different from the service provider identity tag, broadcast a second really simple syndication message only to each of the support team service provider professionals that are identified by association with the service provider identity tag, the other different identity tag, and the at least one component tag, wherein the second really simple syndication message comprises the text message of the second reply in association with the text description of the interruption of service from the alert message, the service provider identity tag, the other different identity tag, and the at least one component tag, without broadcasting the first really simple syndication message to the recipients of the second really simple syndication message;

maintain a plurality of subsequent text messages received from the support team service provider professionals that comprise each of the service provider identity tag and the at least one component tag in association with each other and the alert message or the first reply message in a first alert thread; and maintaining a plurality of subsequent text messages received from the support team service provider professionals that comprise each of the service provider identity tag, the other different identity tag and the at least one component tag in association with each other and the alert message or the second reply message in a second alert thread that is separate and distinct from the first alert thread;

wherein the message board system does not broadcast the first really simple syndication message to the support team service provider professionals recipients of the second really simple syndication message that are identified by association with the service provider identity tag, the other different identity tag, and the at least one component tag; and wherein each of the support team service provider professionals recipients receives in real time really simple syndication messages that are filtered according to associations with respective ones of the service provider identity tag, the other different identity tag, and the at least one component tag.

14. The computer program product of claim 13, wherein the at least one component tag that identifies the infrastructure associated with the service interruption is a plurality of tags that comprises an application tag that identifies a software component associated with the service interruption, and a hardware tag that identifies a hardware component associated with the service interruption.

15. The computer program product of claim 14, wherein the computer readable program code instructions for execution by the computer processing unit, further cause the computer processing unit to send the text description of the interruption of service in the posted alert message to the support team service provider professionals via an instant message, a cellular text message, a chat text message or an email text message.

16. The computer program product of claim 15, wherein the computer readable program code instructions for execution by the computer processing unit, further cause the computer processing unit to, in response of a transfer of the service provider identity tag, the application tag and the hardware tag from a current support team member of the team service provider professionals to a new stakeholder of the team service provider professionals:

broadcast the subsequent text messages received from the support team service provider professionals and maintained in the first alert thread to the new stakeholder but not to the current support team member as a function of the transfer of the service provider identity tag, the application tag and the hardware tag from the current support team member to the new stakeholder.

17. The computer program product of claim 16, wherein the computer readable program code instructions for execution by the computer processing unit, further cause the computer processing unit to, in response to a transfer of the service provider identity tag, the application tag and the hardware tag from the new stakeholder back to the current support team member at the end of a leave period of the current support team member:

broadcast the subsequent text messages received from the support members and maintained in the first alert thread to the current support team member but not to the new stakeholder as a function of the transfer of the service provider identity tag, the application tag and the hardware tag back from the new stakeholder to the current support team member.

* * * * *